United States Patent
Brown et al.

(10) Patent No.: US 7,233,474 B2
(45) Date of Patent: Jun. 19, 2007

(54) VEHICLE ELECTRICAL PROTECTION DEVICE AND SYSTEM EMPLOYING SAME

(75) Inventors: William P. Brown, Rolling Meadows, IL (US); Edwin James Harris, Deerfield, IL (US); Jeffrey John Ribordy, Lake Zurich, IL (US)

(73) Assignee: Littelfuse, Inc., Des Plaines, IL (US)

( * ) Notice: Subject to any disclaimer, the term of this patent is extended or adjusted under 35 U.S.C. 154(b) by 349 days.

(21) Appl. No.: 10/996,638

(22) Filed: Nov. 24, 2004

(65) Prior Publication Data

US 2005/0190519 A1 Sep. 1, 2005

Related U.S. Application Data

(60) Provisional application No. 60/525,196, filed on Nov. 26, 2003.

(51) Int. Cl.
*H02H 5/04* (2006.01)
*B60L 3/00* (2006.01)
(52) U.S. Cl. ..................... 361/104; 307/10.1
(58) Field of Classification Search ............... 361/104; 307/10.1
See application file for complete search history.

(56) References Cited

U.S. PATENT DOCUMENTS

| 480,802 A | 8/1892 | Blathy |
| 1,700,582 A | 1/1929 | Brown |
| 2,245,346 A | 6/1941 | Klein |
| 2,794,346 A | 6/1957 | Jacobs, Jr. |
| 3,619,725 A | 11/1971 | Mendham et al. |
| 3,775,723 A | 11/1973 | Mamrock et al. |
| 3,909,767 A | 9/1975 | Williamson et al. |
| 3,913,219 A | 10/1975 | Lichtblau |
| 4,023,265 A | 5/1977 | Aryamane |
| 4,071,837 A | 1/1978 | Ranzanigo |
| 4,099,320 A | 7/1978 | Schmidt, Jr. et al. |
| 4,131,869 A | 12/1978 | Schmidt, Jr. et al. |
| 4,164,725 A | 8/1979 | Wiebe |
| 4,198,744 A | 4/1980 | Nicolay |
| 4,224,592 A | 9/1980 | Urani et al. |
| 4,278,706 A | 7/1981 | Barry |
| 4,351,014 A * | 9/1982 | Schofield, Jr. ............... 361/100 |
| 4,503,415 A | 3/1985 | Rooney |

(Continued)

FOREIGN PATENT DOCUMENTS

DE 2714779 2/1979

(Continued)

*Primary Examiner*—Stephen W. Jackson
*Assistant Examiner*—Boris Benenson
(74) *Attorney, Agent, or Firm*—Bell, Boyd & Lloyd LLP

(57) ABSTRACT

An electrical protection device is provided. The device can be removably attached to or mounted inside of a power source, such as a vehicle, e.g., automobile, battery and can employ a replaceable fuse element. The device includes an overcurrent protection element, such as a fuse element, and provides any one or more of the following types of electrical protection: (i) overcurrent protection; (ii) accident or catastrophic event power cutout protection; and (iii) load dump protection. The system is configurable to protect certain vehicle electrical components from an overcurrent and allow others to operate independent of the overcurrent protection. Systems and methods employing the protection device are also illustrated and discussed.

51 Claims, 7 Drawing Sheets

U.S. PATENT DOCUMENTS

| | | | |
|---|---|---|---|
| 4,504,816 A | 3/1985 | Viola et al. | |
| 4,514,718 A | 4/1985 | Birx | |
| 4,533,896 A | 8/1985 | Belopolsky | |
| 4,540,969 A | 9/1985 | Sugar | |
| 4,544,907 A | 10/1985 | Takano | |
| 4,547,830 A | 10/1985 | Yamauchi | |
| 4,554,732 A | 11/1985 | Sadlo et al. | |
| 4,570,147 A | 2/1986 | Ebi | |
| 4,580,124 A | 4/1986 | Borzoni | |
| 4,604,602 A | 8/1986 | Borzoni | |
| 4,608,548 A | 8/1986 | Borzoni | |
| 4,612,529 A | 9/1986 | Gurevich et al. | |
| 4,626,818 A | 12/1986 | Hilgers | |
| 4,635,023 A | 1/1987 | Oh | |
| 4,646,053 A | 2/1987 | Mosesian | |
| 4,652,848 A | 3/1987 | Hundrieser | |
| 4,661,793 A | 4/1987 | Borzoni | |
| 4,672,352 A | 6/1987 | Takano | |
| 4,703,299 A | 10/1987 | Vermij | |
| 4,726,991 A | 2/1988 | Hyatt et al. | |
| 4,771,260 A | 9/1988 | Gurevich | |
| 4,792,781 A | 12/1988 | Takahashi et al. | |
| 4,837,520 A | 6/1989 | Golke et al. | |
| 4,869,972 A | 9/1989 | Hatagishi | |
| 4,871,990 A | 10/1989 | Ikeda et al. | |
| 4,873,506 A | 10/1989 | Gurevich | |
| 4,894,633 A | 1/1990 | Holtfreter | |
| 4,926,281 A * | 5/1990 | Murphy | 361/55 |
| 4,975,551 A | 12/1990 | Syvertson | |
| 4,997,393 A | 3/1991 | Armando | |
| 4,998,086 A | 3/1991 | Kourinsky et al. | |
| 5,023,752 A | 6/1991 | Detter et al. | |
| 5,034,620 A * | 7/1991 | Cameron | 307/10.7 |
| 5,084,691 A | 1/1992 | Lester et al. | |
| 5,095,297 A | 3/1992 | Perreault et al. | |
| 5,097,246 A | 3/1992 | Cook | |
| 5,097,247 A | 3/1992 | Doerrwaechter | |
| 5,101,187 A | 3/1992 | Yuza | |
| 5,102,506 A | 4/1992 | Tanielian | |
| 5,102,712 A | 4/1992 | Peirce et al. | |
| 5,115,220 A | 5/1992 | Suuronen et al. | |
| 5,120,617 A * | 6/1992 | Cameron | 429/7 |
| 5,130,688 A | 7/1992 | Van Rietschoten et al. | |
| 5,139,443 A | 8/1992 | Armando | |
| 5,140,295 A | 8/1992 | Vermot-gaud et al. | |
| 5,148,141 A | 9/1992 | Suuronen | |
| 5,155,220 A | 10/1992 | Suuronen et al. | |
| 5,155,462 A | 10/1992 | Morrill, Jr. | |
| 5,166,656 A | 11/1992 | Badihi et al. | |
| 5,207,587 A | 5/1993 | Hamill et al. | |
| 5,340,775 A | 8/1994 | Carruthers | |
| 5,363,082 A | 11/1994 | Gurevich | |
| 5,374,590 A | 12/1994 | Batdorf | |
| 5,569,880 A | 10/1996 | Galvagni et al. | |
| 5,581,225 A | 12/1996 | Oh et al. | |
| 5,631,620 A | 5/1997 | Totsuka et al. | |
| 5,643,693 A * | 7/1997 | Hill et al. | 429/121 |
| 5,645,448 A * | 7/1997 | Hill | 439/522 |
| 5,663,861 A | 9/1997 | Reddy et al. | |
| 5,668,521 A | 9/1997 | Oh | |
| 5,715,135 A | 2/1998 | Brussalis et al. | |
| 5,831,814 A | 11/1998 | Hamill | |
| 5,844,477 A | 12/1998 | Blecha et al. | |
| 6,049,140 A * | 4/2000 | Alksnat et al. | 307/10.2 |
| 6,077,102 A | 6/2000 | Borzi et al. | |
| 6,280,253 B1 | 8/2001 | Kraus et al. | |
| 6,322,376 B1 | 11/2001 | Jetton | |
| 6,496,096 B2 | 12/2002 | Kondo et al. | |
| 6,515,226 B2 | 2/2003 | Chiriku et al. | |
| 6,541,700 B2 | 4/2003 | Chiriku et al. | |
| 6,670,724 B2 * | 12/2003 | Ely et al. | 307/10.1 |

FOREIGN PATENT DOCUMENTS

| | | | |
|---|---|---|---|
| DE | 3417328 A | * 11/1985 | |
| DE | 3530354 A1 | 3/1987 | |
| EP | 0301533 A2 | 7/1988 | |
| EP | 0285489 A1 | 10/1988 | |
| EP | 0453217 A1 | 10/1991 | |
| EP | 0581428 A1 | 2/1994 | |
| EP | 0802553 A2 | 10/1997 | |
| EP | 0939417 A1 | 9/1999 | |
| EP | 1109190 A1 | 6/2001 | |
| FR | 2805662 A1 | 2/2000 | |
| GB | 1604820 | 12/1981 | |
| GB | 2089148 | 6/1982 | |
| GB | 2113489 A | 8/1983 | |
| GB | 2233512 A | 1/1991 | |
| JP | 60180382 | 8/1985 | |
| JP | 4033230 | 2/1992 | |
| JP | 04242036 | 8/1992 | |
| JP | 4245129 | 9/1992 | |
| JP | 4245132 | 9/1992 | |
| JP | 4248221 | 9/1992 | |
| JP | 4255627 | 9/1992 | |
| JP | 5166454 | 7/1993 | |
| JP | 05314888 | 11/1993 | |
| JP | 06103880 | 4/1994 | |
| JP | 10241546 A | 9/1998 | |
| WO | WO90/00305 | 1/1990 | |
| WO | WO91/14279 | 9/1991 | |

* cited by examiner

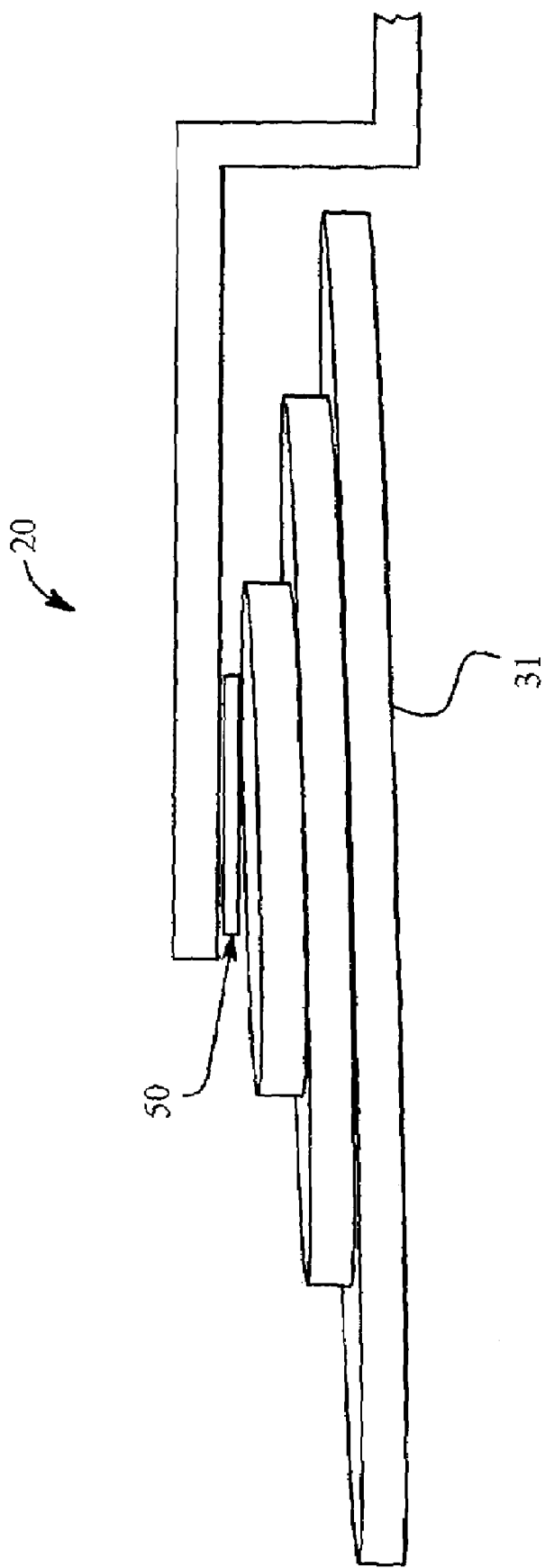

VEHICLE ELECTRICAL PROTECTION DEVICE AND SYSTEM EMPLOYING SAME

RELATED APPLICATIONS

This application claims the benefit of U.S. Provisional Application Ser. No. 60/525,196 filed on Nov. 26, 2003 which is incorporated herein by reference.

BACKGROUND

The disclosed system relates to electrical devices and more particularly to the protection of electrical devices.

Vehicles, such as cars, trucks, recreational vehicles, motorcycles, truck tractors, motor homes, three-wheeled vehicles, snowmobiles, motorboats, aircraft and others each include electrical devices. Typically, these electrical devices are powered by an on-board battery. Batteries in general store energy in chemical form that is released upon demand as electricity. The electrical power is used by the vehicle's ignition system for cranking the engine and may power lights and other accessories. Further, should an alternator belt fail, the battery might also need to power the vehicle's entire electrical system for a short period of time. Automobile batteries are typically twelve volt direct current batteries and supply power over a fairly wide range.

Automobile batteries are often rated in terms of cold cranking amps, which is the ability of the battery to supply an amount of current for 30 seconds at zero degrees Fahrenheit without dropping below a specified cutoff voltage (this is manufacturer specific and can range from 7.2 volts to 10.5 volts). Cold cranking amps for car batteries can range from about 500 amps to about 1,500 amps. Further, smaller batteries for motorcycles, mopeds and other small vehicles can provide amperages as low as twenty-five amps.

As more and more complicated electrical systems are placed into automobiles, the need to protect those devices within those systems as well as to protect the automobile battery will increase. There is also significant work being done to develop a 42 volt automobile generator that would drive a 36 volt battery for higher voltage loads. As voltages of batteries increase, the potential damage also increases. It is therefore desirable to provide a device that protects a vehicle's electrical system when a short circuit or overcurrent condition occurs.

Another problem associated with vehicle batteries, such as automobile batteries, is load dump. The main battery line in an automobile is the source of a number of potentially harmful transients, including load dump. One form of load dump occurs when the connection from the generator or alternator to the battery is broken. The generator in that time continues to provide power and because the battery is not connected to the generator, the power runs into the voltage regulator causing a voltage rise. The mechanical generator typically needs several hundred milliseconds to bring the overvoltage situation under control, but during that time it is possible for the voltage to rise as high as 200 volts. Another form of load dump occurs when a battery cable is suddenly disconnected from the battery. Such a situation can cause overstresses of electronic parts connected to the battery due to the inertial energy within the vehicle's electrical system. A need therefore exists to protect vehicle devices connected to the battery from the dangers due to overvoltage caused by load dump.

Also, as automobiles add electronics to historically mechanical devices, the potential danger upon an accident or other type of catastrophic vehicle event, such as a fire, increases. It is desirable to discontinue power to many electrical components upon such an event. For example, many automobile fuel systems are now controlled electronically. It is desirable to discontinue power to the fuel system upon an accident or catastrophic event to stop the flow of fuel and to minimize injury and damage. Further, an accident can often cause a wire's conductor to be exposed, wherein the exposed wire can then contact the vehicles chassis and cause a short. The short in turn heats and melts the electrical insulation, potentially causing a fire. A need therefore exists for a device that discontinues power to certain electrical vehicle components. On the other hand, it is desirable to maintain power to other components and functions of the vehicle upon an accident or catastrophic event, such as the automobile's flashing lights, door locks, cellular telephone, etc. Accordingly, the device should accommodate that need as well.

SUMMARY

A vehicle electrical protection device is provided. The device can be removably attached to a power source, such as the battery of a vehicle. In one embodiment, the protection device is mounted removably to the exterior of the vehicle's battery. In another embodiment, the protection device is maintained integrally within the battery. In either case, the protection device can have a permanent or replaceable fuse element. That is, in various embodiments, the fuse, the protection device or the power supply employing the device is replaced upon an opening of the fuse element. As described herein, the overcurrent protection device is alternatively resettable.

For purposes of the present disclosure, the term "vehicle" includes but is not limited to an automobile, a motorcycle, a truck tractor, a motor home, a recreational vehicle, a three-wheeled vehicle, a moped, a motorboat, an aircraft and any combination thereof. Also, the term "power source" includes but is not limited to batteries, fuel cells, solar energy devices and electrical generators. Further, while the terms "fuse" and "fuse element" are used throughout the disclosure, the present invention is expressly not limited to metallic fuse elements and instead includes other types of overcurrent protection devices including resettable overcurrent devices. One such resettable overcurrent devices is a positive temperature coefficient ("PTC") device.

The protection device is coupled to the positive and negative terminals of the power source. The device includes a positive contact that is connected electrically to the positive terminal, a negative contact that is connected electrically to the negative terminal and a load contact that is positioned between the positive and negative contacts. In one embodiment, a fuse element is electrically connected between the positive and load contacts. The fuse element is rated for any suitable amperage, such as 20 amps to 2000 amps.

A switching device is provided and is operable to selectively electrically connect the negative terminal to the load contact. The vehicle's negative load line is connected electrically to the power source's negative terminal. The vehicle's main positive load line (i.e., load line connected to devices which are desirably fuse protected) is connected to the fused load terminal instead of to the power source's positive terminal. This configuration enables the fuse element to open when: (i) the power draw exceeds the rated amperage; or (ii) when the switching apparatus closes, causing a short between the load/positive terminals and the negative terminal until the fuse element opens.

The switching apparatus is activated upon an event indicative of an automobile accident or other catastrophe. For example, the switching apparatus can be activated upon the deployment of an airbag. When that occurs, a signal is sent from the airbag, an airbag sensor or an airbag controller to the switching apparatus. The switching apparatus can be one of a multitude of different types of switches. The term "switching apparatus" includes but is not limited to a silicon controlled rectifier ("SCR"), a rotating arm solenoid, a translating arm solenoid, a relay, a metal oxide semiconductor field effect transistor ("MOSFET") and any combination thereof.

The switching device is preferably connected to an inductor to reduce the rate of electrical current rise applied to the switch so that the switch closes as designed. The inductor may be formed as a helical metal piece. The inductor may be formed from the same metal piece as the fuse element or from a separate metal piece.

Each of the electrical load components connected to the fuse protected load line is thus protected from an overcurrent and is de-energized upon an accident or catastrophic event. Certain electrical components within the car may be deemed necessary to be operational upon a catastrophic event or accident (e.g., lights). Therefore, in one embodiment, a second positive load line leading to those non-fuse protected loads is connected to the positive terminal, bypassing the fuse element.

To combat load dump, an overvoltage or intermediate resistance state device, which allows some of the load dump current to flow through the protection device but not enough to open the element, is connected electrically between the negative contact and the load contact as a voltage limiter. The overvoltage device in essence provides two functions: (i) clamps the voltage at a desired voltage, e.g., fifteen to sixty volts or more; and (ii) limits the amount of current flowing through the device. If a voltage spike from a load dump scenario occurs, e.g., the generator becomes disattached from the battery or a lead becomes disattached from the power source, the overvoltage device clamps any voltage spike occurring along the positive load line and allows the voltage spike to be dissipated across the overall protection device to the negative terminal of the power source and eventually to ground or chassis of the vehicle. The protection device in one embodiment doubles therefore as a load dump protection device.

To the above described ends, in one embodiment an electrical protection device is provided including: a positive contact configured to be coupled to a positive terminal of a power source; a negative contact configured to be coupled to a negative terminal of the power source, and wherein one of the positive and negative contacts is configured to be placed in electrical communication with a first load line; a load contact configured to be coupled to a second load line; a fuse element connected electrically to one of the positive and negative contacts; and a switching apparatus connected electrically to one of the negative contacts and the load contact.

The protection device may be mounted inside or outside of the power source. The fuse element may be replaceable. The switching apparatus may be a silicon controlled rectifier ("SCR"), a solenoid, a relay, a metal oxide semiconductor field effect transistor ("MOSFET"), and/or any other suitable switching device. Preferably, the protection device includes a load dump protection device connected electrically to the negative contact and the load contact. The load dump devices discharges a voltage from a load component. The load dump protection device may be a transient voltage suppression ("TVS") diode, a silicon avalanche diode ("SAD"), a multilayer varistor ("MLV"), a metal oxide varistor ("MOV"), and/or any other suitable load dump protection device.

Preferably, the switching apparatus is operated by a signal source. The signal source may be from an airbag, an airbag sensor, an airbag controller, a heat sensor, a motion sensor, an impact sensor, a fuel sensor, a pressure sensor, a liquid sensor, and/or any suitable signal source. Example protected load components include a battery cable, a fuel injector, an engine fan, a starter, a heater, a compressor, and/or any other component that should be turned off in case of an emergency. Example non-protected load components include a power locking device (e.g., door), a flashing light, a power window motor, a communications device (e.g., cellular telephone), and/or any other component that should remain on in case of an emergency.

BRIEF DESCRIPTION OF THE FIGURES

FIG. 8 is a front view of the example vehicle electrical protection device of FIG. 5 showing the helical inductor and the switching apparatus.

DETAILED DESCRIPTION

Figure 1:
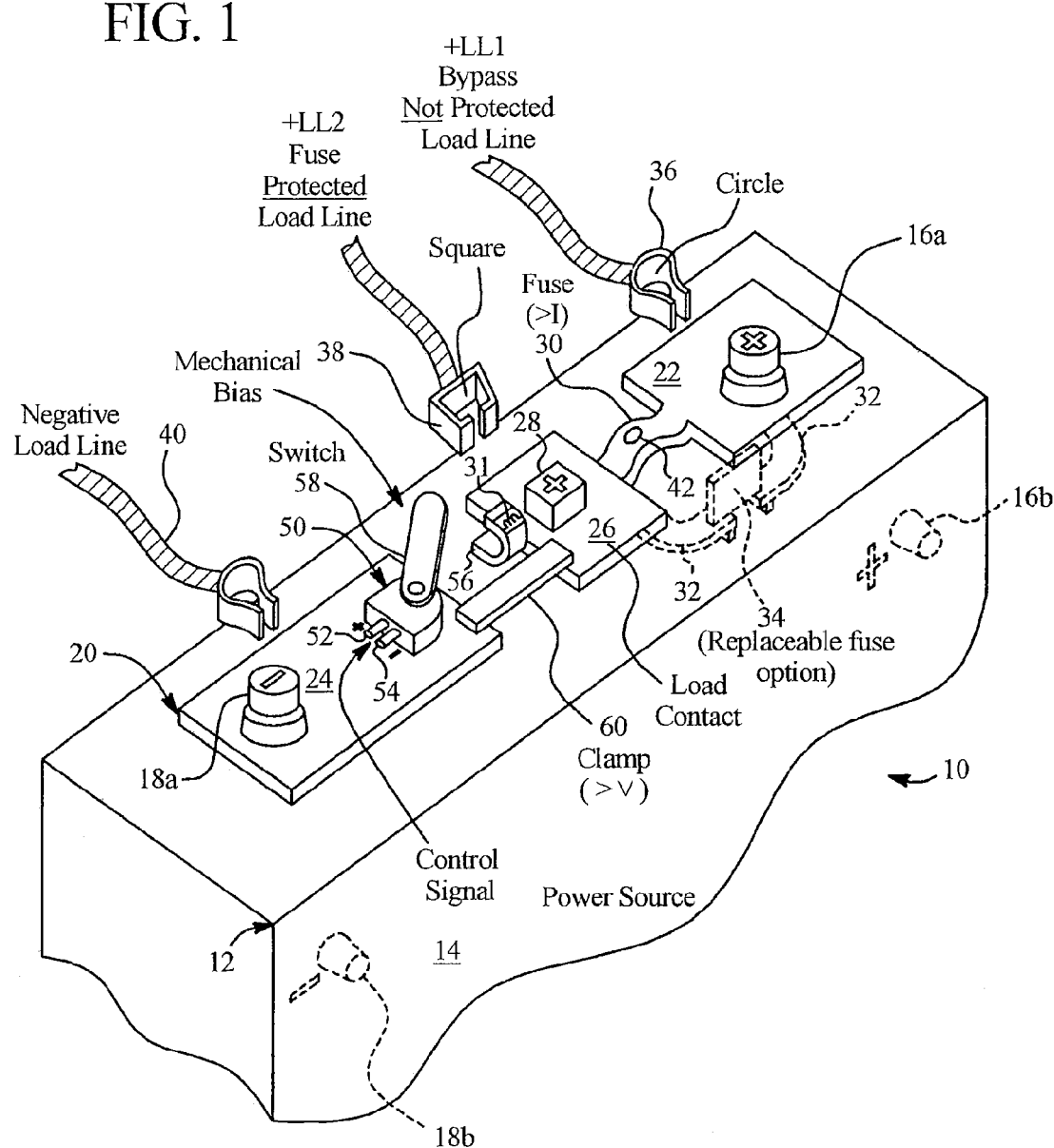
FIG. 1 is a perspective view illustrating one embodiment of an automobile electrical system employing an example vehicle electrical protection device.

Referring now to the drawings and in particular to FIG. 1, one embodiment of an electrical protection device used in a vehicle electrical system is illustrated by system 10. System 10 includes a power source 12, such as a battery, having a housing 14. Positive and negative terminals 16a and 18a, respectively, extend from housing 14. In the illustrated embodiment, terminals 16a and 18a extend vertically upward, however, the terminals can extend in any suitable direction from housing 14. An electrical protection device 20 is fitted onto leads 16a and 18a. Protection device 20 includes a positive contact 22 that is in electrical communication with positive terminal 16a of power source 12. Protection device 20 also includes a negative terminal 24 that makes electrical contact with negative terminal 18a. Device 20 includes a load contact 26 placed between contacts 22 and 24 in the illustrated embodiment.

Load contact 26 includes or defines a load terminal 28. Load terminal 28 in one embodiment can have a different and unique shape or size from the shape of terminals 16a and 18*a*. As discussed in more detail below, that different shape helps to prevent a misconnection of the load lines.

A fuse element 30 is provided between contacts 22 and 26. Fuse element 30 in one embodiment is a curved or straight metal piece having a cross-sectional area less than the area of the contacts 22 to 26, which creates a weak point in the electrical connection between terminals 16*a* and 18*a*, causing the electrical connection upon an overcurrent to open at fuse element 30. Contacts 22, 24 and 26 can be the same or of a different material or metal as fuse element 30. Any one or more of those contacts or element can be copper, a copper alloy, zinc or any other suitable metal, such as silver, gold, tin, solder and any combination or alloy thereof. Further, it is possible that any one or more of those contacts or element is plated, e.g., silver plated copper, silver plated zinc, tin plated copper, tin plated zinc or multilayer plating. Fuse element 30 can also be formed from two dissimilar metals. Upon an overcurrent, one metal will diffuse into another to create an alloy with a higher electrical resistance, thereby lowering the temperature required to open the fuse element 30. Lower temperature metal 32 provides additional control in achieving a fuse element having a desired or defined current rating.

Giving the term "vehicle" each of its possible meanings described above, fuse element 30 is rated for any suitable vehicle power supply current rating. The amperage rating range is from about 20 amps to about 2,000 amps, but could be configured for higher or lower amperages. A typical automobile application might have an upper current limit of about 50 amps to about 500 amps.

Protection device 20 in an alternative embodiment includes electrical electrodes 32 shown in phantom, which connect electrically to a replaceable fuse 34 also shown in phantom. Electrodes 32 and replaceable fuse 34 can be used in place of or in addition to fuse element 30. Indeed, U.S. patent application Ser. No. 10/090,896, entitled Multi-Element Fuse Array, assigned to the assignee of the present invention, the entire contents of which are incorporated by reference, describes a similar type of arrangement. That is, it is possible that fuse element 30 is provided initially, wherein no replacement fuse 34 is needed or used. After fuse element 30 opens, replacement fuse 34 is inserted into electrodes 32 to remake the connection between contacts 22 and contacts 26. Alternatively, fuse element 30 is not provided and fuse 34 is instead employed initially to make said contact. Further alternatively, electrodes 32 and fuse 34 are not used and device 20 is replaced after element 30 opens.

Protection device 20, in an alternative embodiment, is formed on a printed circuit board ("PCB"). In such a case, fuse element 30 includes one or more PCB traces along the board between contacts 22 and 26, which themselves are copper or other metal provided on the PCB.

As illustrated, power source 12 and protection device 20 connect removably and electrically to a plurality of load lines. In particular, positive load line 36 is connected to positive terminal 16*a*. Positive load line 38 is connected to load terminal 28. Negative load line 40 is connected to negative terminal 18*a*. Those physical connections in one embodiment also secure protection device 20 physically in place. Alternatively, protection device 20 is held in place via an independent attachment mechanism (not shown).

Load line 40 is a negative load line, which extends from negative terminal 18*a* to the vehicle's chassis or ground. In some instances, such as with a starter that draws a relatively high amount of current, load line 40 extends to the high current component instead of to the chassis. Fuse protected load line 38 extends from load terminal 28 to electrical components within the vehicle that are intended to be protected by fuse element 30. Bypass load line 36 extends from positive terminal 16*a* to electrical components within the vehicle that are not intended to be protected by fuse element 30. The terminal heads of load lines 36 and 38 are shaped differently to match differently shaped terminals 16*a* and 28 to at least help to avoid the possibility of connecting electrical components that are not intended to be protected by fuse element 30 to load terminal 28 and vice versa.

A switching apparatus 50 is provided to selectively make electrical connection between contacts 24 and 26. In the illustrated embodiment, switching apparatus 50 includes leads 52 and 54, which can be plug-type leads. In an embodiment, switching apparatus 50 receives via leads 52 and 54 a signal from a vehicle component upon a vehicle collision or catastrophic event. For example, the signal can flow to switching apparatus 50 from an exploded airbag, an airbag sensor, an airbag controller, a heat sensor, a motion sensor, an impact sensor, a force sensor, a fuel sensor, a pressure sensor, a liquid sensor and any combination thereof. That is, multiple different types of sensing devices, alone or in combination, can detect if an accident or other type of harmful situation has occurred and thereafter send a signal to switching apparatus 50.

Figure 2:
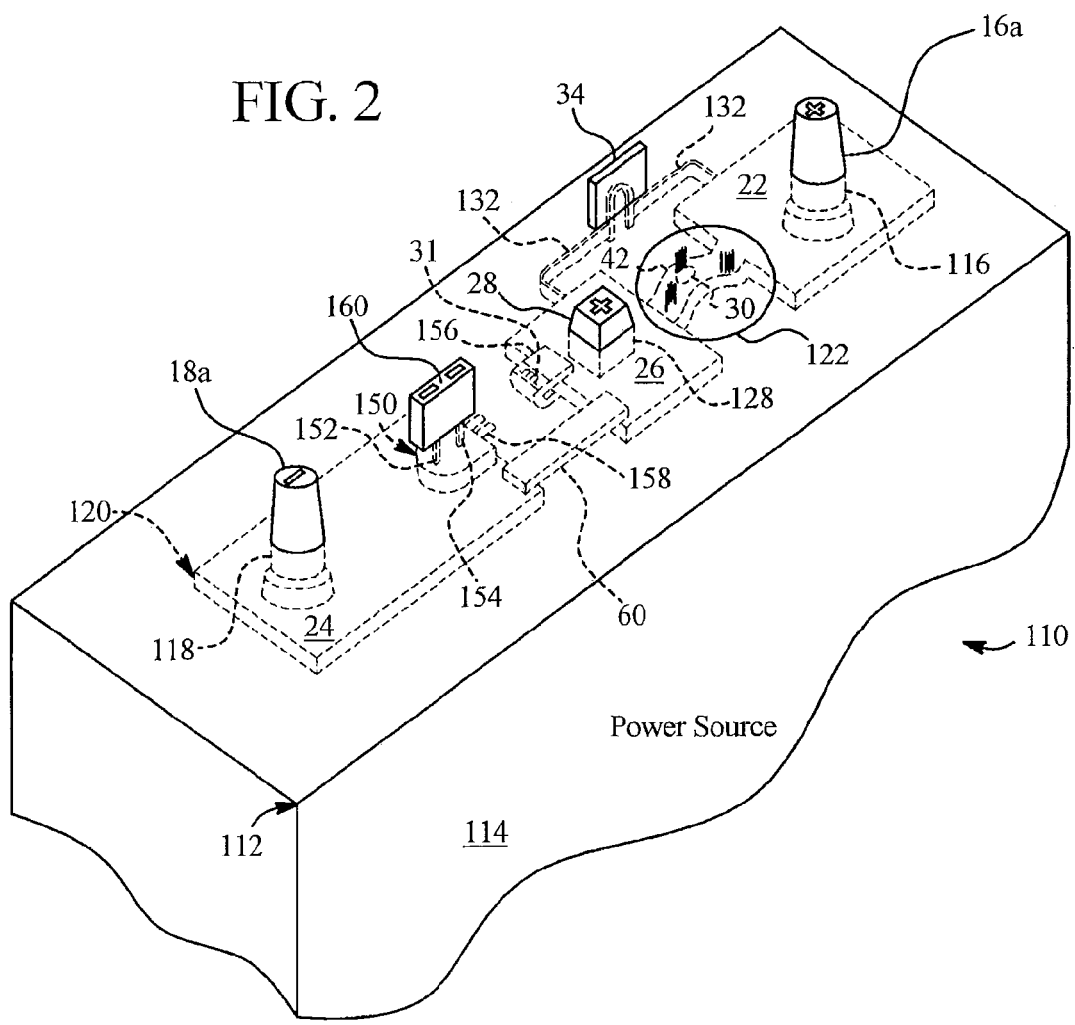
FIG. 2 is a perspective view illustrating another embodiment of an automobile electrical system employing an integrally mounted vehicle electrical protection device.

Switching apparatus 50 can be any suitable apparatus that makes electrical contact upon receiving a signal from an external source. For example, the switching apparatus 50 may be a silicon controlled rectifier (SCR), a relay (solid state or mechanical) or a MOSFET. In the illustrated embodiment, switching apparatus 50 is a swing-arm type solenoid that makes contact with a mating member 56 connected electrically to contact 26. Switching apparatus 50 is shown in a normally open state in FIG. 1. Upon receiving a signal from one or more remote accident sensing sources, switching apparatus 50 causes an arm 58 to rotate and make contact with mating member 56. FIG. 2 shows an alternative plunger-type switching apparatus 150, wherein a plunger 158 moves translationally to make contact with mating member 156.

In one embodiment, the switching apparatus 50 is a silicon controlled rectifier ("SCR"). The SCR is normally nonconducting as long as an integral gate is at a lower voltage than an integral cathode. If the gate voltage becomes larger than the cathode voltage (e.g., upon receiving a signal from a signal source), the SCR becomes conductive (and may eventually become a short) thereby allowing current to pass from an anode to a cathode. This in turn allows current to flow through electrical protection device 20, which causes fuse element 30 to open. SCRs are well suited for the present application because (i) SCRs continue to conduct current once they are activated, and (ii) SCRs tend to fail in a conductive mode (i.e., fail short as opposed to fail open).

However, SCRs and other switching devices 50 intended to close upon an activation signal (e.g., application of an electrical current) may fail open upon excessive current and/or voltage. For example, an SCR may mechanically fail if the SCR experiences a large current spike. Preferably, an inductor 31 is connected in series with the switch 50 to prevent this from happening. The inductor 31 slows the rate of electrical current rise applied to the switch 50 so that the switch closes as designed. In one embodiment, at least one of the two sides the switching device 50 is mechanically biased toward the other side of the switching device 50 in order to keep the two sides of the switching device 50 in electrical contact when the switching device is closed.

In one embodiment, the switching apparatus 50 is a MOSFET. MOSFETs employ a breakdown voltage, which is the voltage at which a reverse biased diode breaks down to enable significant current to flow between a source and a drain. In system 10, the MOSFET breaks down at a particular voltage supplied by the signal source to enable current to flow directly between terminals 16a and 18a, causing fuse element 30 to open.

As discussed above, it is desirable to discontinue power to a vehicle's electrical system upon an accident or catastrophic event. For example, vehicle components that may need to be protected upon such event include, but are not limited to, a battery cable, a fuel injector, an engine fan, a starter, a heater, a compressor and any other component, especially high current draw components. On the other hand, components that may need to continue to receive power after an accident or catastrophic event may include, but are not limited to, a power locking device (e.g., door), headlights, interior lights, emergency lights, automatic window motors, communications systems (e.g., cellular telephone, On-Star™, etc.) and potentially others. Protection device 20 enables such a fuse/bypass configuration.

Some batteries provide top mount terminals as shown as terminals 16a and 18a Other batteries provide side mount terminals as shown in phantom as terminals 16b and 18b. Either type of terminal may be used with the protection device 20 described herein.

As illustrated and discussed, fuse element 30 opens in a first instance when too much current is being demanded from fuse protected load line 38. In that manner, fuse element 30 provides overcurrent protection to the components connected to line 38. Fuse element 30 also protects the power source from being overly stressed. Fuse 30 in a second instance also opens upon a vehicle accident or catastrophic event when switching apparatus 50 receives a signal indicating such event and closes to make a direct connection between terminals 16a and 18a. It should be appreciated that device 20 in alternative embodiments is provided having only overcurrent protection or only disaster or catastrophic event protection.

Further alternatively, any combination of the above types of protection can be combined with a third type of protection provided by protection device 20, namely, load dump protection. As discussed above, vehicle load dump can be caused via a number of electrical connection failures within the vehicle, such as a failed connection between the vehicle's generator and battery or a disconnection of one of the leads, e.g., leads 36, 38 or 40 from its respective terminal, namely, terminals 16a, 28 and 18a. A load dump can cause a rather high voltage spike or transient to occur within the vehicle's electrical system.

To combat load dump, an overvoltage protection device 60 is connected electrically to contact 24 and contact 26. Overvoltage protection device 60 clamps the voltage spike cause by load dump and enables an intermediate amount of current, e.g., an amount less than the fuse element rating, to flow though electrical protection device 20 to negative terminal 18a, negative load line 40 and eventually to the vehicle chassis or other type of vehicle or non-vehicle ground. Overvoltage device 60 can be but is not limited to a transient voltage suppression ("TVS") diode, a silicon avalanche diode ("SAD"), a multilayer varistor ("MLV") and a metal oxide varistor ("MOV"), each of which exhibit and are selected to have a particular clamping voltage.

Overvoltage device 60 is sized or selected to have a voltage above the normal operating range of: (i) the power source or (ii) the electrical system, e.g., above 12 volts or 14 volts for an automobile battery and electrical system respectively, but lower than a voltage that could potentially cause harm to components within the vehicle. One suitable range of clamping voltages for overvoltage protection device 60 is from about fifteen volts to about sixty volts. The present invention is expressly not limited to such range especially in light of the current work being done to develop 36 volt battery and 42 volt automobile generation systems. Further, non-vehicle type power generation systems could require lower or higher and potentially significantly higher clamping voltages.

In normal operation, e.g., when no load dump condition is present, overvoltage protection device 60 has a high resistivity. The normal resistance of overvoltage protection device 60 is such that very little current flows across protection device 20. When a voltage transient or spike does occur, overvoltage protection device 60 switches to a controlled and intermediate resistivity and clamps the spike at a suitable voltage, which enables the energy from the spike to dissipate across protection device 20 to the vehicle chassis or otherwise to ground.

As discussed above, electrical protection device 20 can include any combination of the different types of electrical protection described herein, including only providing load dump protection if desired. Protection device 20 is capable, however, of providing overcurrent protection, catastrophic event or accident protection as well as load dump protection.

FIG. 1. illustrates a number of embodiments for replacing or resetting protection device 20 after the fuse element 30 opens, including completely replacing protection device 20 or replacing an opened replaceable fuse 34, such as a blade fuse. FIG. 2 illustrates an alternative system 110, wherein an alternative device 120 is integrated within an alternative power source 112. Alternative device 120 includes many of the same components described above and numbered the same, such as contacts 22, 24 and 26. Those contacts are shown in phantom because they are installed beneath the housing 114 of power source 112. Each of the components shown in solid resides on top of power source 112.

As discussed above, a fuse element 30 is electrically connected between contacts 22 and 26. An alternative switching device 150 is positioned to make electrical contact with mating member 156. Mating member 156 then connects to contact 26 via inductor 31. Placed in parallel with switching apparatus 150 is an overvoltage protection device 60 that provides load dump protection as described above. The power source also includes terminals 16a and 18a as described above and can include alternative side extending terminals 16b and 18b described in connection with FIG. 1.

Terminals 16a and 18a are connected electrically to device contacts 22 and 24, respectively, via internal leads 116 and 118, respectively. The load terminal 28 is also provided on top of power source 112 and makes an electrical connection with contact 26 via lead 128. As before, load terminal 28 can have a different shape than positive terminal 16a to prevent improper electrical connection. The same load lines 36 to 40 described above can be used in connection with system 110 of FIG. 2. Protection device 120 also includes electrical electrodes 132 that receive a replacement fuse 34 if initial fuse element 30 is opened. Alternatively, fuse element 30 is not provided and instead the fuse or blade fuse 34 is used initially. Further alternatively, electrodes 132 and fuse 34 are not used, wherein power source 112 is discarded after fuse element 30 is opened.

A suitable viewing window 122 is provided so that the vehicle operator or technician can detect that fuse element 30 has opened. It is also possible to coat fuse element 30 with a suitable material that vaporizes with heat and collects on viewing window 122 to provide further visual evidence that fuse element 30 has opened.

In a similar manner, a connector 160, such as a plug connector, is provided and placed in electrical contact with signal leads 152 and 154 of switching apparatus 150. The operator simply connects a mating signal line connector (not illustrated) into connector 160 to enable operation of switching apparatus 150. Device 120 operates the same as and includes all the same operational alternatives as described above for device 20.

Figure 3:
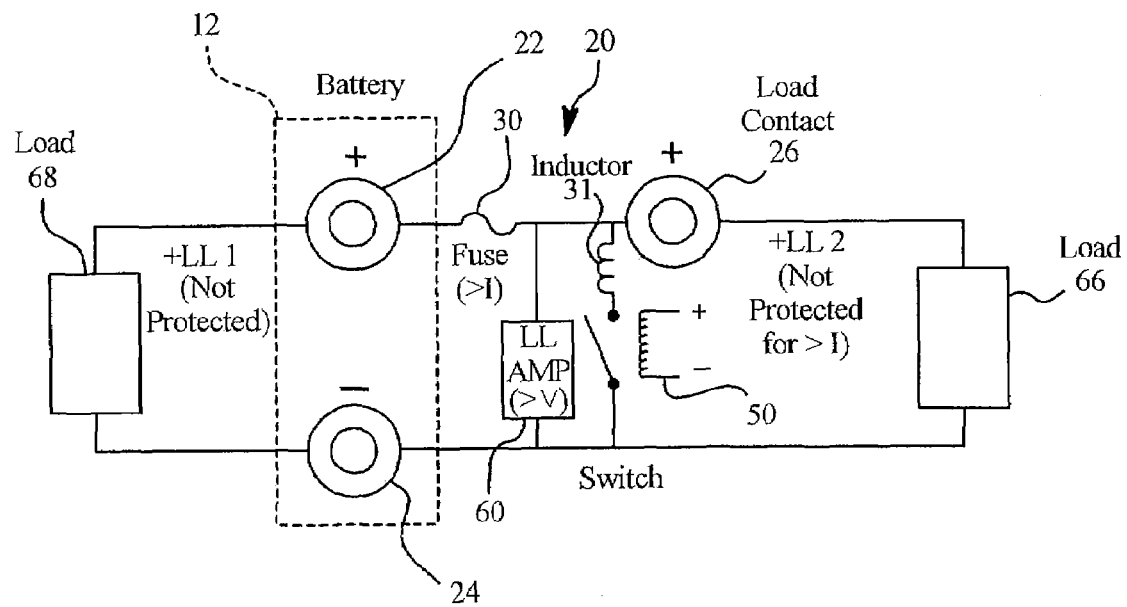
FIG. 3 is an electrical schematic showing an example vehicle electrical protection device wherein the fuse element and fuse protected contact terminal are placed on a positive side of the battery.
Figure 4:
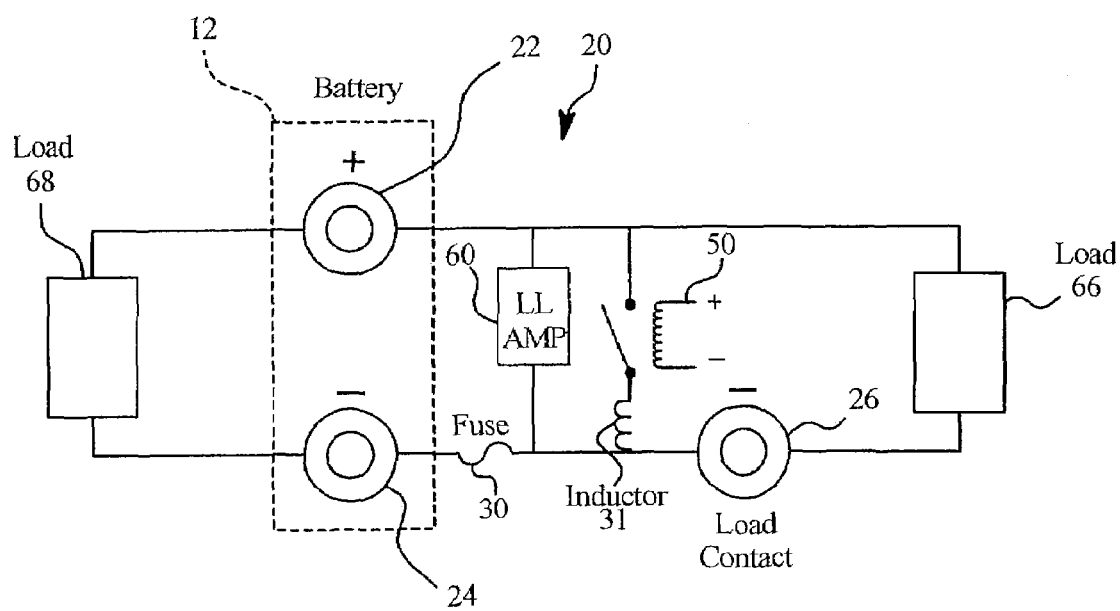
FIG. 4 is an electrical schematic showing an example vehicle electrical protection device wherein the fuse element and fuse protected contact terminal are placed on a negative side of the battery.

Referring now to FIGS. 3 and 4, various electrical configurations for the protection devices of the present invention are illustrated. For purposes of illustration, power source 12 and the components used in connection with system 10 and device 20 in FIG. 1 are shown. It should be appreciated, however, that each of the alternatives shown in FIGS. 3 and 4 is equally applicable to system 110 and protection device 120 of FIG. 2.

Each of FIGS. 3 and 4 includes a schematically representative positive contact 22, negative contact 24 and load contact 26. In addition, each of the configurations includes a switching apparatus 50 shown figuratively as a relay. Each configuration also includes the overvoltage protection device 60 operating in parallel with switching apparatus 50 described above. Further, each of the configurations includes a fuse element 30 and an inductor 31.

The configurations also include a fuse element protected load 66 and an unprotected or bypass load 68. Those loads refer respectively to electrical components within the vehicle that are either desirably fuse protected or left powered upon a vehicle accident or catastrophic event. The configurations differ primarily in the placement of the fuse element 30 and the contact terminal 26. The configurations each operate exactly the same, however, they illustrate that the present invention includes any configuration that achieves the stated functions of the device 20.

FIG. 3 illustrates schematically the arrangement of components shown in FIG. 1. FIG. 4 moves fuse element 30, inductor 31, and contact 26 to the negative side of load 66, so that both are positioned on the opposite side of load 66 from positive contact 22, and so that both are in direct electrical communication with negative contact 24.

Figure 5:
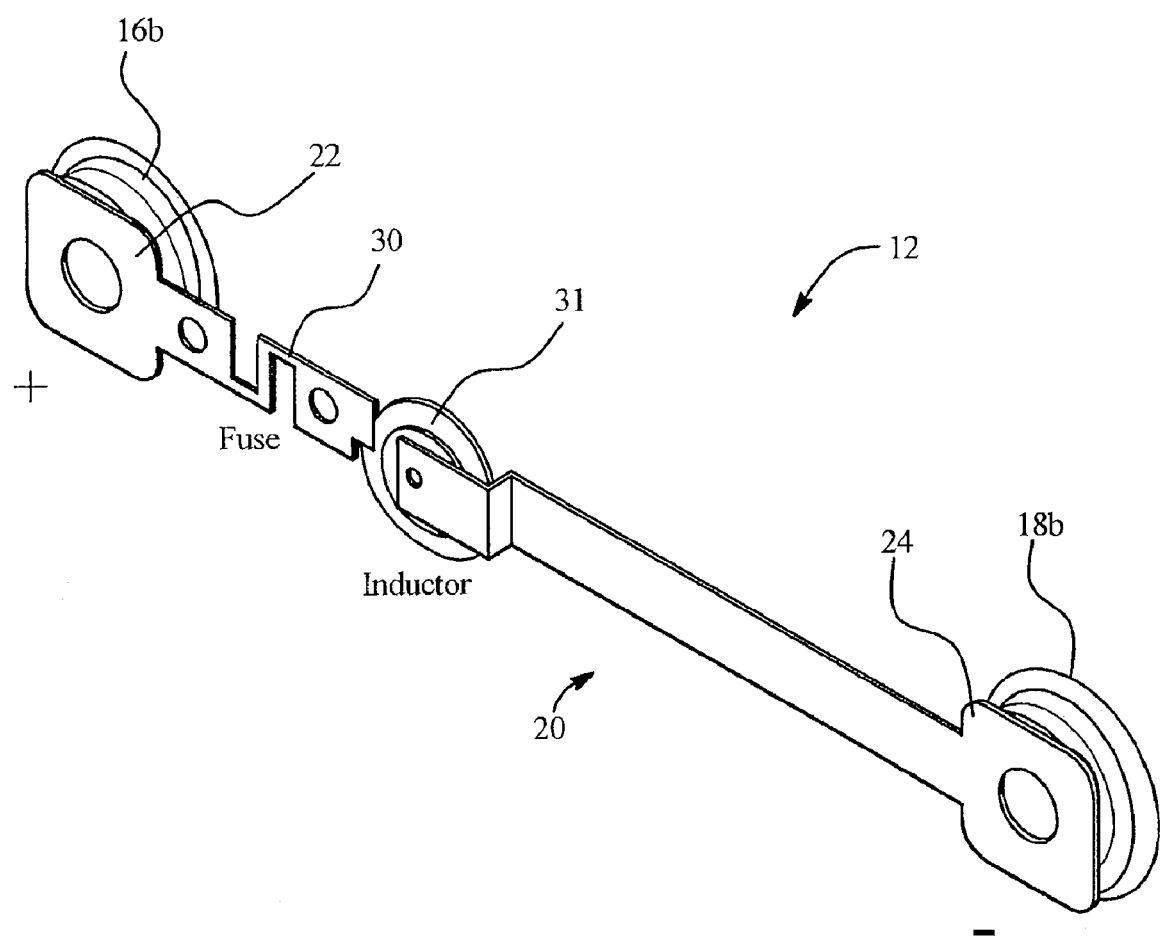
FIG. 5 is a perspective view illustrating another embodiment of the automobile electrical system employing an example vehicle electrical protection device.
Figure 6:
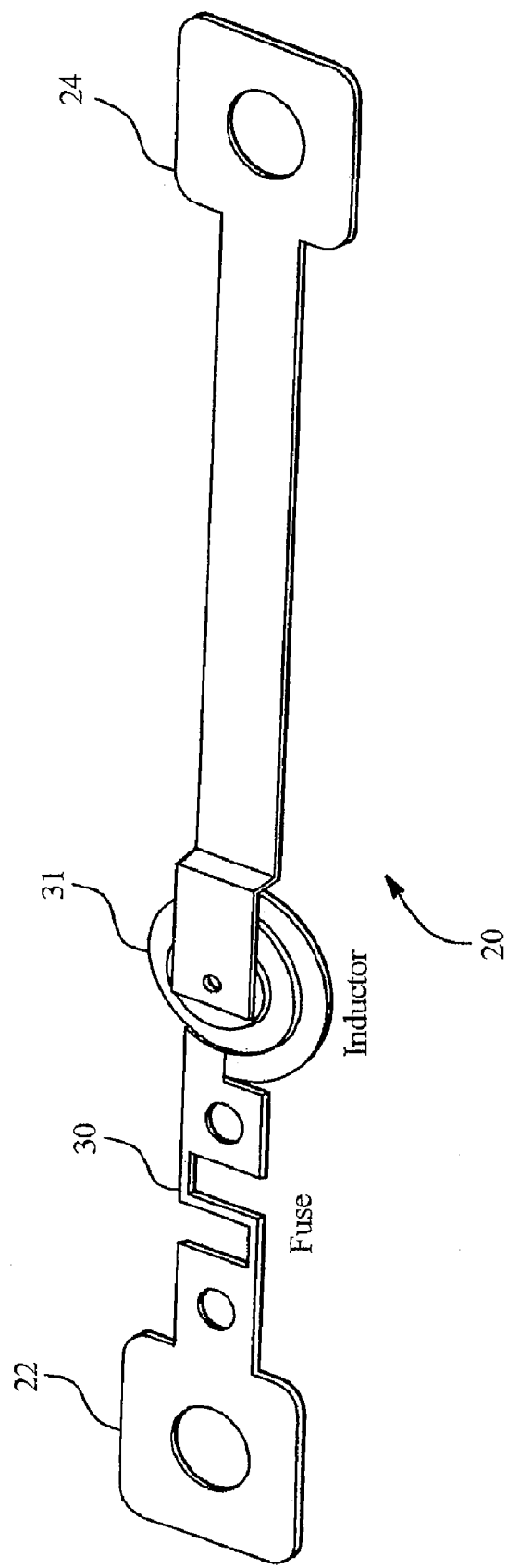
FIG. 6 is a perspective view illustrating the example vehicle electrical protection device of FIG. 5.
Figure 7:
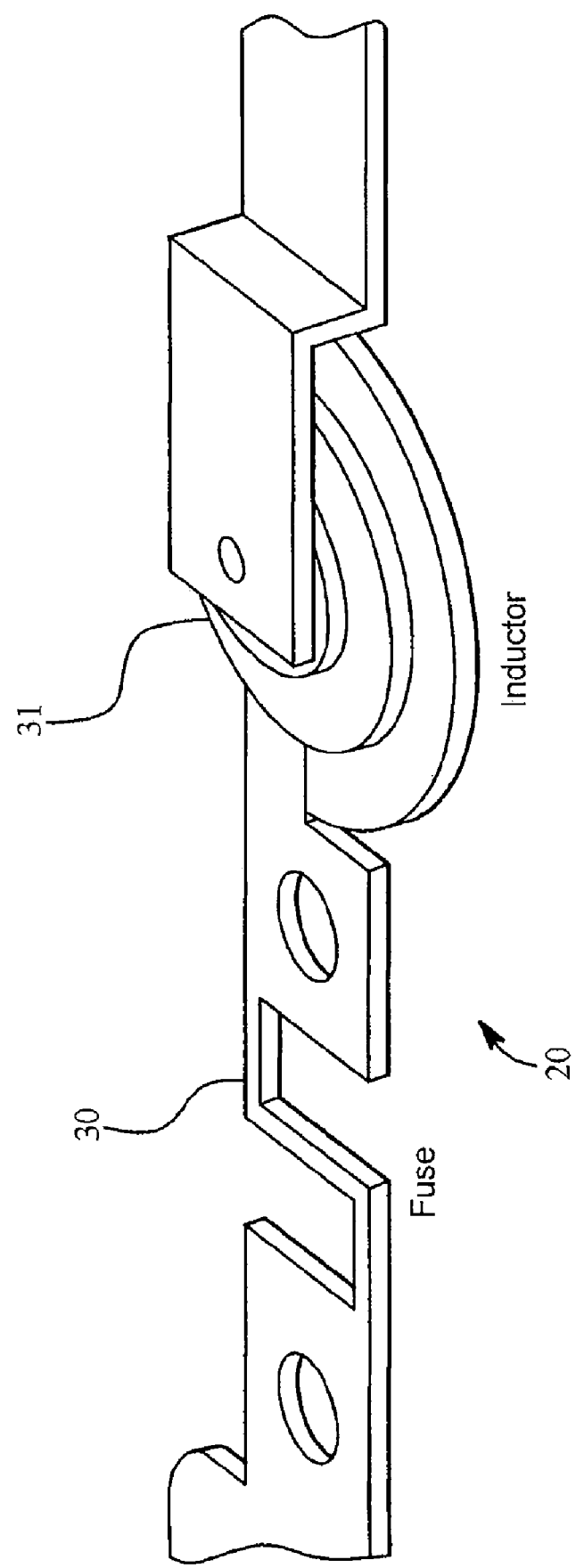
FIG. 7 is a perspective view of the example vehicle electrical protection device of FIG. 5 showing the helical inductor and fuse assembly.

FIGS. 5-8 illustrate another example of the protection device 20. In FIG. 5, the protection device 20 is mechanically connected to the side terminals 16b and 18b of a power source 12, such as an automobile battery. As shown in the example configuration of FIGS. 5-8, the protection device 20 includes a fuse element 30 and an inductor 31. In this example, the fuse element 30 is a straight metal piece having a reduced cross-sectional area, which creates a weak point in the electrical connection. When an overcurrent condition occurs, the fuse element 30 permanently opens.

In this example, the inductor 31 is formed as a helical metal piece. The inductor 31 may be formed from the same metal piece as the fuse element 30 or from a separate metal piece. Any suitable material may be used to form the inductor 31. In addition, the inductor 31 may be of any suitable shape. For example, a square or rectangular shaped inductor may be used. The inductor 31 may be constructed to electrically connect two pieces in two separate planes (as shown), or the inductor 31 may be constructed substantially in a single plane. In one embodiment, the inductor 31, or a portion of the inductor 31, also acts as the fuse element 30.

As shown in FIG. 8, the protection device 20 also includes a switching apparatus 50. In this example, the switching apparatus 50 is an SCR device. The helical inductor 31 slows the rate of electrical current rise applied to the SCR so that the SCR "melts" together to form a permanently closed connection.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An electrical protection device comprising:
a first contact electrically coupled to a first terminal of a vehicle battery and electrically coupled to a first load line;
a second contact electrically coupled to a second terminal of the vehicle battery and electrically coupled a second load line, the second contact having a different electrical polarity than the first contact;
a third contact electrically coupled to a third load line;
a fuse element electrically coupled to the first contact and the third contact, wherein the fuse element provides overcurrent protection to the third load line but not the first load line; and
a switching apparatus electrically coupled to the second contact and the third contact, wherein if the switching apparatus is closed the fuse element opens a connection between the first contact and the third contact.

2. The electrical protection device of claim 1, wherein the first contact comprises an electrically positive contact and the second contact comprises an electrically negative contact.

3. The electrical protection device of claim 1, wherein the first contact comprises an electrically negative contact and the second contact comprises an electrically positive contact.

4. The electrical protection device of claim 1, wherein the switching apparatus is electrically coupled to at least one of the second contact and the third contact via an inductor.

5. The electrical protection device of claim 4, wherein the inductor and the fuse element are formed from a single metal piece.

6. The electrical protection device of claim 4, wherein the inductor is formed as a helical metal piece.

7. The electrical protection device of claim 6, wherein the inductor and the fuse element are formed from a single metal piece.

8. The electrical protection device of claim 1, wherein the first contact and the second contact have a first shape and the third contact has a second different shape.

9. The electrical protection device of claim 1, wherein the switching apparatus has a first side and a second side and the first side is mechanically biased toward the second side.

10. The electrical protection device of claim 1, which is arranged to be mounted inside of the vehicle battery.

11. The electrical protection device of claim 10, including a viewing window over the fuse element.

12. The electrical protection device of claim 11, wherein the fuse element is coated with a material that vaporizes with heat and collects on the viewing window.

13. The electrical protection device of claim 1, which is arranged to be mounted outside of the vehicle battery.

14. The electrical protection device of claim 1, wherein the switching apparatus includes a device selected from the group consisting of a silicon controlled rectifier ("SCR") a solenoid, a relay and a metal oxide semiconductor field effect transistor ("MOSFET").

15. The electrical protection device of claim 1, which includes a load dump protection device connected electrically to the second contact and the third contact.

16. The electrical protection device of claim 15, wherein the load dump protection device is selected from the group consisting of: a transient voltage suppression ("TVS") diode, a silicon avalanche diode ("SAD"), a multilayer varistor ("MLV") and a metal oxide varistor ("MOV").

17. The electrical protection device of claim 1, wherein the switching apparatus is activated upon receiving a signal from a signal source.

18. The electrical protection device of claim 1, wherein the fuse element is rated between 20 amps and 2,000 amps.

19. The electrical protection device of claim 1, wherein the fuse element is connected electrically to a load dump protection device and the switching apparatus.

20. The electrical protection device of claim 1, wherein the fuse element is connected electrically to the first contact and the switching apparatus.

21. The electrical protection device of claim 1, wherein the fuse element is connected electrically to the first contact and the switching apparatus via an inductor.

22. A power source comprising:
a body;
positive and negative terminals extending from the body; and
a protection device connected electrically to the positive and negative terminals, the device including (i) a load contact, (ii) a fuse element located between the load contact and one of the positive and negative terminals, (iii) a switching apparatus positioned to cause the fuse element to open upon receiving a signal from a signal source, and (iv) an inductor located between the fuse element and the switching apparatus to reduce a rate of current rise applied to the switching apparatus.

23. The power source of claim 22, wherein the inductor and the fuse element are formed from a single metal piece.

24. The power source of claim 22, wherein the inductor is formed as a helical metal piece.

25. The power source of claim 24, wherein the inductor and the fuse element are formed from a single metal piece.

26. The electrical protection device of claim 22, wherein the switching apparatus has a first side and a second side and the first side is mechanically biased toward the second side.

27. The power source of claim 22, which includes a load dump device placed in parallel with the switching apparatus.

28. The power source of claim 22, wherein the positive and negative terminals are configured to connect to a bypass load line, wherein the bypass load line operates independent of the fuse element.

29. The power source of claim 22, wherein the positive and negative terminals are first such terminals and which includes second positive and negative terminals operating independent of the fuse element.

30. The power source of claim 22, wherein the protection device is located at least in part inside the body.

31. The power source of claim 30, wherein the fuse element is replaceable.

32. The power source of claim 30, including a viewing window over the fuse element.

33. The power source of claim 32, wherein the fuse element is coated with a material that vaporizes with heat and collects on the viewing window.

34. The power source of claim 22, wherein the protection device is located outside the body.

35. The power source of claim 34, wherein the protection device is replaceable.

36. The power source of claim 34, wherein the fuse element is replaceable.

37. An automobile electrical system comprising:
a power supply;
a protection device connected electrically to the power supply, the device including a fuse element and a switching apparatus operable to open the element upon receiving a signal from a signal source;
at least one first load component connected electrically to the power supply and the device and subject to surge protection provided by the fuse element;
at least one second load component coupled electrically to the power supply and operating independent of the fuse element of the device;
an inductor connected to reduce a rate of current rise applied to the switching apparatus.

38. The system of claim 37, wherein the fuse is a positive temperature coefficient overcurrent device.

39. The power source of claim 38, wherein the inductor and the fuse element are formed from a single metal piece.

40. The power source of claim 38, wherein the inductor is formed as a helical metal piece.

41. The electrical protection device of claim 37, wherein the switching apparatus has a first side and a second side and the first side is mechanically biased toward the second side.

42. The system of claim 37, further comprising a load dump apparatus operable to discharge a voltage from the first load component.

43. The system of claim 37, wherein the signal source is selected from the group consisting of: an airbag, an airbag sensor, an airbag controller, a heat sensor, a motion sensor, an impact sensor, a fuel sensor, a pressure sensor, a liquid sensor and any combination thereof.

44. The system of claim 37, wherein the first load component comprises a battery cable.

45. The system of claim 37, wherein the first load component is selected from the group consisting of: a fuel injector, an engine fan, a starter, a heater, a compressor and any combination thereof.

46. The system of claim 37, wherein the second load component is selected from the group consisting of a power locking device, a flashing light, a power window motor, a communications device and any combination thereof.

47. A vehicle electrical supply protection method comprising:
receiving a signal indicative of an emergency event;
closing a switch in response to receiving the signal, wherein closing the switch comprises mechanically biasing the switch;
opening a fuse in response to closing the switch;
stopping the supply of electrical current to a first load component in response to opening the fuse; and
continuing to supply electrical current to a second load component after opening the fuse.

48. The method of claim 47, wherein closing the switch comprises permanently closing the switch.

49. The method of claim 47, wherein opening the fuse comprises permanently opening the fuse.

50. The method of claim 47, further comprising providing load dump protection to discharge energy stored in the first load component and the second load component.

51. The method of claim 47, wherein opening the fuse comprises increasing resistance in a positive temperature coefficient overcurrent device.

* * * * *